US00RE40406E

(19) United States
(12) Reissued Patent
McCormick et al.

(10) Patent Number: US RE40,406 E
(45) Date of Reissued Patent: Jul. 1, 2008

(54) PROCESS FOR COATING AND/OR TOUCHING UP COATINGS ON METALLIC SURFACES

(75) Inventors: David R. McCormick, Clawson, MI (US); Andreas Lindert, Troy, MI (US)

(73) Assignee: Henkel KGaA (DE)

(21) Appl. No.: 10/810,546

(22) Filed: Mar. 26, 2004

Related U.S. Patent Documents

Reissue of:
(64) Patent No.: 6,361,622
Issued: Mar. 26, 2002
Appl. No.: 09/486,097
Filed: Feb. 22, 2000

U.S. Applications:
(60) Provisional application No. 60/056,488, filed on Aug. 21, 1997.

(51) Int. Cl.

| | |
|---|---|
| ***C23C 22/07*** | (2006.01) |
| ***C23C 22/24*** | (2006.01) |
| ***C23C 22/33*** | (2006.01) |
| ***B05D 1/18*** | (2006.01) |
| ***B05D 3/02*** | (2006.01) |

(52) U.S. Cl. ..... 148/247; 106/14.12; 106/14.44; 148/243; 148/258; 148/261; 148/264; 148/268; 427/384; 427/435; 427/419.1; 427/419.2

(58) Field of Classification Search ..... 106/14.12, 106/14.44; 148/243, 247, 258, 261, 264, 148/268; 427/384, 419.1, 419.2, 435
See application file for complete search history.

(56) References Cited

U.S. PATENT DOCUMENTS

| | | | | |
|---|---|---|---|---|
| 4,264,378 | A | 4/1981 | Oppen et al. | |
| 4,384,902 | A | 5/1983 | Crotty et al. | |
| 4,749,418 | A | 6/1988 | Saeki et al. | |
| 5,449,415 | A | 9/1995 | Dolan | |
| 5,807,442 | A | 9/1998 | Goodreau | |
| 6,758,916 | B1 * | 7/2004 | McCormick | 148/251 |

FOREIGN PATENT DOCUMENTS

| | | |
|---|---|---|
| EP | 0015020 | 9/1980 |
| EP | 0019430 | 11/1980 |
| EP | 0214571 | 3/1987 |
| EP | 0391442 | 10/1990 |
| GB | 2259920 | 3/1993 |
| WO | WO91/05078 | 4/1991 |
| WO | WO95/25831 | 9/1995 |
| WO | WO96/07772 | 3/1996 |
| WO | WO96/19595 | 6/1996 |
| WO | WO97/02369 | 1/1997 |
| WO | WO97/21845 | 6/1997 |
| WO | WO97/41277 | 11/1997 |

* cited by examiner

*Primary Examiner*—Anthony J. Green
(74) *Attorney, Agent, or Firm*—Mary K. Cameron

(57) ABSTRACT

A composition and method for coating and touching up a metal surface is provided. The composition contains from about 0.5 to about 240 millimoles per kilogram of a fluorometallate ion, from about 0.5 grams/liters to about 10 grams/liter of phosphorous-containing inorganic oxy anions calculated at their stoichiometric equivalent as $H_3PO_4$; [from about 0.05 g/l to about 3.5 g/l of] hexavalent chromium [and from about 0.10 g/l to about 2.20 g/l of] trivalent chromium ions *and a surfactant*.

22 Claims, No Drawings

PROCESS FOR COATING AND/OR TOUCHING UP COATINGS ON METALLIC SURFACES

Matter enclosed in heavy brackets [ ] appears in the original patent but forms no part of this reissue specification; matter printed in italics indicates the additions made by reissue.

This application is a 371 of PCT/US98/17194 filed Aug. 21, 1998, which claims the benefit of U.S. Provisional Application No.60/056,488, filed Aug. 21, 1997.

This invention relates to processes for treating a metal surface to form a protective coating, or for treating a metal surface on which a protective coating has previously been formed and remains in place, with its protective qualities intact, on one part of the surface but is totally or partially absent from, or is present only in a damaged condition over, one or more other parts of the surface, so that its protective value in these areas of at least partial damage or absence has been diminished. (Usually the absence or damage of the initial protective coating has been unintentional and has occurred as a result of such events as imperfectly uniform formation of the initial protective coating, mechanical damage of the initial protective coating, spotty exposure of the initially coated surface to solvents for the initial protective coating, or the like. The absence or damage of the initial protective coating may be intentional, however, as when holes are drilled in a contact surface, for example, or when untreated parts are attached to and therefore become part of a previously coated surface.) Particularly if the surface in question is large and the damaged or untreated area(s) are relatively small, it is often more economical to attempt to create or restore the full protective value of the original coating primarily in only the absent or damaged areas, without completely recoating the object. Such a process is generally known in the art, and will be briefly described herein, as "touching up" the surface in question. This invention is particularly well suited to touching up surfaces in which the original protective coating is a conversion coating initially formed on a primary metal surface, more particularly a primary metal surface consisting predominantly of iron, aluminum, and/or zinc.

An alternative or concurrent object of this invention is to provide a process for protectively coating metal surfaces that were never previously coated. Other concurrent or alternative objects are to achieve at least as good protective qualities in the touched up areas as in those parts of the touched up surfaces where the initial protective coating is present and undamaged; to avoid any damage to any pre-existing protective coating from contacting it with the touching up composition; and to provide economical touching up process. Other objects will be apparent to those skilled in the art from the description below.

Except in the claims and the operating examples, or where otherwise expressly indicated, a numerical quantities in this description indicating amounts of material or conditions of reaction and/or use are to be understood as modified by the word "about" in describing the broadest scope of the invention. Practice within the numerical limits stated is generally preferred. Also, throughout this description, unless expressly stated to the contrary: percent, "parts of", and ratio values are by weight; the term "polymer" includes "oligomer", "copolymer", "terpolymer", and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description or of generation in situ by chemical reactions specified in the description, and does not necessarily preclude other chemical interactions among the constituents of a mixture once mixed; specification of materials in ionic form additionally implies the presence of sufficient constituents to produce electrical neutrality for the composition as a whole (any counterions thus implicitly specified should preferably be selected from among other constituents explicitly specified in ionic form, to the extent possible; otherwise such counterions may be freely selected, except for avoiding counterions that act adversely to the objects of the invention); and the term "mole" and its grammatical variations may be applied to elemental, ionic, and any other chemical species defined by number and type of atoms present, as well as to compounds with well defined molecules.

SUMMARY OF THE INVENTION

It has been found that excellent coating and/or touching up quality, particularly for corrosion resistance on previously untreated areas and corrosion resistance in combination with a conversion coating, can be achieved by:

(I) covering the areas to be touched up with a layer of a liquid composition that comprises, preferably consists essentially of, or more preferably consists of, water and:
- (A) a component of fluorometallate anions, each of said anions consisting of:
  - (i) at least four fluorine atoms; and
  - (ii) at least one atom of an element selected from the group consisting of titanium, zirconium, hafnium, silicon, aluminum, and boron; and, optionally, one or both of
  - (iii) at least one ionizable hydrogen atom; and
  - (iv) at least one oxygen atom;
- (B) a component of phosphorus-containing inorganic oxyanions and/or phosphonate anions; and
- (C) a component of oxidizing agent or agents that are not part of either of immediately previously recited components (A) and (B) and are not chromium(III) cations;

and, optionally, one or more of the following components:
- (D) chromium(III) cations;
- (E) a component of free fluoride ions that are not part of any of immediately previously recited components (A) through (D);
- (F) a component of surfactant molecules that are not part of any of immediately previously recited components (A) through (E);
- (G) an acidifying component that is not part of any of the immediately previously recited components (A) through (F); and
- (H) a viscosity increasing component that is not part of any of the immediately previously recited components (A) through (G);

and subsequently (II) drying into place over the surface the liquid layer formed in step (I).

It should be understood that the components listed need not necessarily all be provided by separate chemicals. For example, it is preferred that the fluorometallate anions and phosphorous-containing anions both be added in the form of the corresponding acids, thereby also providing at least some, and usually all, of optional acidifying component (G).

Various embodiments of the invention include processes for treating surfaces as described above, optionally in combination with other process steps that may be conventional per se, such as precleaning, rinsing, and subsequent further protective coatings over those formed according to the invention, compositions useful for treating surfaces as described above, and articles of manufacture including surfaces treated according to a process of the invention.

DETAILED DESCRIPTION OF THE INVENTION

For a variety of reasons, it is preferred that compositions used according to the invention as defined above should be substantially free from many ingredients used in compositions for similar purposes in the prior art. Specifically, it is increasingly preferred in the order given, independently for each preferably minimized component listed below, that these compositions, when directly contacted with metal in a process according to this invention, contains no more than 1.0, 0.35, 0.10, 0.08, 0.06, 0.04, 0.02, 0.01, 0.005, 0.002, 0.001, 0.0005, or 0.0002 percent of each of the following constituents: dispersed (in this instance not including truly dissolved) silica and/or silicates; ferricyanide; ferrocyanide; sulfates and sulfuric acid; anions containing molybdenum or tungsten; alkali metal and ammonium cations; pyrazole compounds; sugars; glyconic acid and its salts; glycerine; α-glucoheptanoic acid and its salts; and myoinositol phosphate esters and salts thereof.

A working composition for use in a process according to this invention preferably has a concentration of at least, with increasing preference in the order given, 0.5, 1.0, 1.5, 2.0, 2.5, 3.0, 3.5, 4.0, 4.5, or 4.8 millimoles of fluorometallate anions, component (A), per kilogram of total working compositions, this unit of concentration being freely applicable hereinafter to any other constituent as well as to fluorometallate anions and being hereinafter usually abbreviated as "mM/kg"; and if the maximum corrosion protection from a single treatment with a composition used in a process according to the invention is desired as it often is, this concentration of fluorometallate anions more preferably is at least, with increasing preference in the order given, 6.0, 7.0, 8.0, 10.0, 11.0, 12.0, 13.0, 14.0, 15.0, 16.0, 17.0, 18.0, 19.0, 20.0, 21.0, 22.0, 23.0, or 24.0 mM/kg. Independently, in a working composition, the concentration of fluorometallate ions preferably, at least for economy, is not more than, with increasing preference in the order given, 240, 150, 100, 80, 60, 50, 45, 40, 35, 30, or 27 mM/kg, and if the working composition is intended for use in a process in which at least two treatments according to the invention will be applied to the substrate, this concentration of fluorometallate anions still more preferably is not more than, with increasing preference in the order given, 20, 15, 12, 10, 8.0, 7.0, 6.5, 6.0, 5.5, or 5.1 mM/kg.

Independently of their concentration, the fluorometallate anions preferably are fluorosilicate (i.e., $SiF_6^{-2}$), fluorotitanate (i.e., $TiF_6^{-2}$) or fluorozirconate (i.e., $ZrF_6^{-2}$), more preferably fluorotitanate or fluorozirconate, most preferably fluorozirconate.

Component (B) as defined above is to be understood as including all of the following inorganic acids and their salts and acid salts that may be present in the composition: hypophosphorous acid ($H_3PO_2$), orthophosphorous acid ($H_3PO_3$), polyphosphoric acid ($H_4P_2O_7$), orthophosphoric acid ($H_3PO_4$), tripolyphosphoric acid ($H_5P_3O_{10}$), and further condensed phosphoric acids having the formula $H_{A+2}P_4O_{3x+1}$, where x is a positive integer greater than 3. Component (B) also includes all phosphoric acids and their salts.

Generally, inorganic phosphates, particularly orthophosphates, phosphites, hypophosphites, and/or pyrophosphates, especially orthophosphates, are preferred for component (B) because they are more economical. Phosphonates are also suitable and may be advantageous for use with very hard water, because the phosphonates are more effective chelating agents for calcium ions. Acids and their salts in which phosphorous has a valence less than five may be less stable than the others to oxidizing agents and are therefore less preferred.

A composition according to the invention preferably contains at least, in increasing preference in the order given, 0.01, 0.05, 0.1, 0.2, 0.3, 0.4, 0.5, 0.6, 0.65, or 0.70 parts, measured as its stoichiometric equivalents as $H_3PO_4$ of component (B) per thousand parts of total composition, a concentration unit that may be freely used hereinafter for other constituents and is hereinafter usually abbreviated as "ppt". Independently, in a working composition used in a process according to the invention, the concentration of component (B), measured as its stoichiometric equivalent as $H_3PO_4$, preferably is not more than, in increasing order of preference, 10, 9.0, 8.0, 7.0, 6.0, 5.0, 4.0, 3.0, 2.0, 1.00, 0.90, or 0.80 ppt.

The oxidizing agent, component (C), preferably is selected from hydrogen peroxide; alkyl and other substituted peroxides; materials containing hexavalent chromium, such as chromates and dichromates; manganates and permanganates; chlorates and perchlorates; iodates and periodates; nitrates; bromates and perbromates, molybdenum, vanadates, and all of the acids corresponding to all of the previously listed anions in this sentence. Unless the use of hexavalent chromium as at least part of oxidizing agent component (C) is barred because of fears of pollution and/or personnel hazard, the use of hexavalents chromium is strongly preferred. More particularly, the amount of hexavalent chromium present in a working composition for use according to the invention, an amount which may readily be determined analytically by means known in the art, preferably is at least, with increasing preference in the order given, 0.30, 0.50, 0.70, 1.00, 1.25, 1.50, 1.75, 2.00, 2.25, 2.50, or 2.70 grams of hexavalent chromium per liter of total working composition, a unit of measure which may be applied hereinafter to other components, and which is hereinafter usually abbreviated as "g/l." Independently, the concentration of hexavalent chromium is a working composition used in a process according to this invention preferably is not greater than, with increasing preference in the order given, 30, 25, 20, 15, 10, 8, 6, 5.0, 4.0, 3.5, 3.3, 3.1, or 2.9 g/l.

Hexavalent chromium may be applied to the working composition from any water soluble source, including numerous available dichromate and chromate salts. However, at least for reasons of economy, the hexavalent chromium preferably is supplied as the chemical substance with the formula $CrO_3$, usually named "chromic acid" or "chromium trioxide".

If the oxidizing agent component does not include hexavalent chromium, its "oxidizing power" should be adjusted to fall within the same range as is achieved in an alternative working composition by use of preferred amounts of hexavalent chromium as indicated above, together with all other necessary and preferred constituents as described herein. The oxidizing power for this purpose may be conveniently measured by the electrical potential of an inert metal electrode, such as a platinum electrode, that is in physical contact with the liquid for which the oxidizing power is to be measured. The electrical potential of the inert metal electrode is measured by comparison with a reference electrode of known conventionally established potential, by means known to those skilled in the art.

When oxidizing agent component (C) includes hexavalent chromium as it preferably does, optional component (D) of chromium(III) cations preferably is also used. At least one reason for this preference is that the presence of chromium (III) cations is useful in preventing, or at least diminishing, leaching by water of the hexavalent chromium content of the coating formed in a process according to this invention when hexavalent chromium is a part of the treatment composition used. The source of the chromium(III) ions may be any soluble or solubilizable source whose counterions do not interfere with the objects of the invention. Soluble salts include the acetate, bromide hexahydrate, chloride hexahydrate, iodide, nitrate oxalate or sulfate of chromium (III); complexes such as hexammine chromium(III) chloride, and others which are chemically compatible with the coating composition. However, at least in part for economy, the chromium(III) cations present in a composition used in a process according to this invention preferably are desired from an in situ reduction of part of a source of hexavalent chromium added to provide, from its unreduced portion, at least part of composition (C). Suitable reducing agents are well known to those skilled in the art, with organic compounds, particularly inexpensive carbohydrates such as sugar and starch, normally preferred.

The concentration of chromium(III) cations is preferably at least, in increasing order of preference, 0.10, 0.25, 0.50, 0.75, 1.00, 1.25, 1.50, 1.60, or 1.70 g/l. The ratio of hexavalent chromium atoms to trivalent chromium atoms in a composition to be used in a process according to this invention is preferably at least, in increasing preference in the order given, 0.50:1.00, 0.75:1.00, 1.00:1.00, 1.10:1.00, 1.20:1.00, 1.30:1.00, 1.40:1.00, 1.45:1.00, or 1.50:1.00 and independently preferably is not more than, with increasing preference in the order given, 20:1.00, 10:1.00, 5:1.00, 3.0:1.00, 2.5:1.00, or 2.0:1.00. The total concentration of chromium atoms of any valence in a working composition according to the invention is preferably at least, with increasing preference in the order given, 0.45, 0.60, 0.80, 1.2, 1.5, 2.0, 2.5, 3.0, 3.5, 3.8, 4.0, or 4.4 g/l, and independently, primarily for reasons of economy, is preferably not more than, with increasing preference in the order given, 50, 35, 20, 14, 10, 9.0, 8.0, 7.0, 6.5, 6.0, 5.5, 5.0, or 4.6 g/l. Preferred amounts of chromium(III) cations in a working composition to be used according to the invention may be determined by subtracting from these numbers the values given above for the concentration of hexavalent chromium.

If the fluorometallate anions concentration exceeds 4.8 mM/kg in a composition to be used in a process according to this invention, optional component (E) of free fluoride ions is preferably included also, unless the composition is to be used within a few days of having been made. Otherwise, formation of a precipitate during storage of the composition is likely. This component may be supplied to the composition by hydrofluoric acid or any of its partially or completely neutralized salts that are sufficiently water soluble. At least for economy, component (E) is preferably supplied by aqueous hydrofluoric acid, and independently preferably is present in a concentration that is at least, with increasing preference in the order given, 0.10, 0.30, 0.50, 0.60, 0.70, 0.80, or 0.90 ppt of its stoichiometric equivalent as HF. Independently, in a working composition to be used in a process according to the invention, the concentration of component (E), measured as its stoichiometric equivalent as HF, preferably is not more than, with increasing preference in the order given, 10, 8.0, 6.0, 4.0, 3.0, 2.0, 1.5, 1.3, or 1.1 ppt.

Component (F), if used, is chosen from anionic surfactants, such as salts of carboxylic acids, alkylsulphonates, alkyl-substituted phenylsulphonates; nonionic surfactants, such as alkyl-substituted dephenylacetylenic alcohols and nonylphenol polyoxyethylenes; and cationic surfactants such as alkylammonium salts; all of these may and preferably do contain fluorine atoms bonded directly to carbon atoms in their molecules. Each molecule of a surfactant used preferably contains a hydrophobe portion that (i) is bonded by a continuous chain and/or ring of covalent bonds; (ii) contains a number of carbon atoms that is at least, with increasing preference in the order given, 10, 12, 14, or 16 and independently preferably is not more than, with increasing preference in the order given, 30, 26, 22, or 20; and (iii) contains no other atoms except hydrogen, halogen, and ether-bonded oxygen atoms. Component (F) is most preferably a fluorinated alkyl ester such as FLUORAD™ FC 430, a material commercially supplied by Minnesota Mining and Manufacturing Co.

A working composition according to the invention preferably contains, with increasing preference in the order given, at least 0.010, 0.030, 0.050, 0.070, 0.080, 0.090, or 0.100 ppt of component (F) and independently preferably, primarily for reasons of economy, contains not more than, with increasing preference in the order given, 5.0, 2.5, 1.30, 0.80, 0.60, 0.40, 0.40, 0.30, 0.20, 0.18, 0.15, 0.13, or 0.11 ppt of component (F).

The pH of a composition used according to the invention preferably is at least, with increasing preference in the order given, 0.10, 0.30, 0.50, 0.70, 0.90, 1.10, 1.20, 1.30, 1.40, 1.50, 1.55, or 1.60 and independently preferably is not more than, with increasing preference in the order given, 5.0, 4.0, 3.5, 3.0, 2.90, 2.80, 2.70, 2.60, 2.50, 2.40, 2.30, 2.20, 2.10, 2.00, 1.90, 1.80, or 1.70. Ordinarily, a preferred pH will result automatically from use of preferred concentrations of hexavalent chromium, phosphate ions, fluorometallate anions, and free fluoride ions supplied to the composition from preferred acidic sources as already noted. If, however, in some particular instance, a preferred pH value is not achieved in this manner, other acidifying agents are well known in the art and may be used as optional component (G). This component, however, is normally preferably omitted, at least for economy.

Dilute compositions, within these preferred ranges, that include the necessary active ingredients (A) through (C) only may have inadequate viscosity to be self-supporting in the desired thickness for touching up areas that can not be placed in a substantially horizontal position during treatment and drying; if so, one of the materials known in the art, such as natural gums, synthetic polymers, colloidal solids, or the like should be used as optional component (H), as is generally known in the art, unless sufficient viscosity is provided by one or more of other optional components of the composition. If the characteristic treatment composition is to be applied in a process according to the invention by use of a saturated felt or like material, component (H) is rarely needed and usually is preferably omitted, because most viscosity increasing agents are susceptible to being at least partially filtered out of the treatment composition by applicators of this type.

A working composition according to the invention may be applied to a metal workpiece and dried thereon by any convenient method, several of which will be readily apparent to those skilled in the art. For example, coating the metal with a liquid film may be accomplished by immersing the surface in a container of the liquid composition, spraying the composition on the surface, coating the surface by passing it between upper and lower rollers with the lower roller immersed in a container of the liquid composition, contact with a brush or felt saturated with the liquid treatment composition, and the like, or by a mixture of methods. Excessive amounts of the liquid composition that might otherwise remain on the surface prior to drying may be removed before drying by any convenient method, such as drainage under the influence of gravity, passing between rolls, and the like.

A particularly advantageous method of application of the treatment liquid in a process according to the invention makes use of an applicator as disclosed in U.S. Pat. No. 5,702,759 of Dec. 30, 1997 to White et al., the entire disclosure of which, except for any part that may be inconsistent with any explicit statement herein, is hereby incorporated herein by reference.

The temperature during application of the liquid composition may be any temperature within the liquid range of the composition, although for convenience and economy in application, normal room temperature, i.e., from 20–27° C., is usually preferred.

Preferably the amount of compositions applied in a process according to this invention is chosen so as to result, after drying into place, in at least as good corrosion resistance for the parts of the surface treated according to the invention as in the parts of the same surface where the initial protective coating is present and a process according to the invention has not been applied. Ordinarily, for most common protective phosphate and chromate conversion coatings as initial protective coatings, such protection will be achieved if the total add-on mass (after drying) of the coating applied in a process according to the invention is at least, with increasing preference in the order given, 0.005, 0.010, 0.015, 0.020, 0.025, 0.030, 0.035, 0.040, 0.045, 0.050, 0.055, or 0.060 grams per square meter of surface coated (hereinafter usually abbreviated as "$g/m^2$"). Independently, at least equal corrosion resistance ordinarily will be achieved even if the add-on mass is not, and therefore for reasons of economy the add-on mass preferably is not greater than, with increasing preference in the order given 1.00, 0.70, 0.50, 0.30, 0.20, 0.15, 0.10, 0.090, 0.085, 0.080, or 0.075 $g/m^2$.

The add-on mass of the protective film formed by a process according to the invention may be conveniently monitored and controlled by measuring the add-on weight or mass of the metal atoms in the anions of component (A) as defined above, or of chromium when that is part of component (C) of the treatment composition used, except in the unusual instances when the initial protective coating and/or the underlying metal substrate contains the same metal element(s). The amount of these metal atoms may be measured by any of several conventional analytical techniques known to those skilled in the art. The most reliable measurements generally involve dissolving the coating from a known area of coated substrate and determining the content of the metal of interest in the resulting solution. The total add-on mass can then be calculated from the known relationship between the amount of the metal in component (A) and the total mass of the part of the total composition that remains after drying. However, this method is often impractical for use with this invention, because the area touched up is not always precisely defined. A more practical alternative is generally provided by small area X-ray spectrographs that, after conventional calibration, directly measure the amount(s) per unit area of individual metallic element(s) present in a coating, free from almost all interferences except the same elements present in other changes on, or in a thin layer near the surface of, the underlying metal surface itself.

In many instances sufficiently precise control of the amount of coating used can be determined visually from the color of the area coated, because most preferred compositions for use according to the invention are fairly strongly colored. Unless the surface to be treated happens to be the same or a similar color, the amount of active ingredients can therefore be estimated by the intensity of the color of the liquid film formed in a process according to the invention.

The effectiveness of a treatment according to the invention appears to depend predominantly on the total amounts of the active ingredients that are dried in place on each unit area of the treated surface, and on the nature of the active ingredients and their ratios to one another, rather than on the concentration of the acidic aqueous composition used, and the speed of drying has not been observed to have any technical effect on the invention, although it may well be important for economic reasons. If practical in view of the size of the object treated and the size of the areas of the object to be treated, drying may be speeded by placement of the surface to be treated, either before or after application to the surface of a liquid composition in a process according to the invention, in an oven, use of radiative or microwave heating, or the like. If speed of treatment is desired, but placing the entire object in an oven is inconvenient, a portable source of hot air or radiation may be used in the touched up area(s) only. In either instance, heating the surface before treatment is preferred over heating after treatment when practical, and prewarming temperatures up to at least 65° C. may be satisfactorily used. If ample time is available at acceptable economic cost, a liquid film applied according to this invention often may simply be allowed to dry spontaneously in the ambient atmosphere with equally good results insofar as the protective quality of the coating is concerned. Suitable methods for each circumference will be readily apparent to those skilled in the art.

Preferably, the surface to be treated according to the invention is first cleaned of any contaminants, particularly organic contaminants and foreign metal fines and/or inclusions. Such cleaning may be accomplished by methods known to those skilled in the art and adapted to the particular type of substrate to be treated. For example, for galvanized steel surfaces, the substrate is most preferably cleaned with a conventional hot alkaline cleaner, then rinsed with hot water and dried. For aluminum, the surface to be treated most preferably is first contacted with a conventional hot alkaline cleaner, then rinsed in hot water, then, optionally, contacted with a neutralizing acid rinse and/or deoxidized, before being contacted with an acid aqueous composition as described above. Ordinarily, cleaning methods suitable for the underlying metals will also be satisfactory for any part of the initial protective coating that is also coated in a process according to the invention, but care should be taken to choose a cleaning method and composition that do not themselves damage the protective qualities of the initial protective coating in areas that are not to be touched up. If the initial protective coating is thick enough, the surface can be satisfactorily cleaned by physically abrading, as with sandpaper or another coated abrasive, the area(s) to be touched up and any desired overlap some where the initial protective coating is still in place around the damaged areas to be touched up. The swarf may then be removed by blowing, brushing, rinsing, or with attachment to a cleaning tool, such as a moist cloth. It has been found that, when dry abrasion is used as the last preparatory cleaning method, the corrosion resistance of the coating usually will be less than optimal and the coating will appear smutty. However, dry abrasion followed by rinsing is a satisfactory and often preferred cleaning method. One indication that the surface is sufficiently clean is that a film of water sprayed on the surface will dry without beading.

After the preparatory cleaning, the surface may be dried by absorption of the cleaning fluid, evaporation, or any suitable method known to those skilled in the art. Corrosion resistance is usually less than optimal when there is a delay between the preparatory cleaning, or cleaning and drying, and the coating of the surface. The time between cleaning, or cleaning and drying, and coating the surface should be no more than, in increasing order of preference, 48, 24, 6.0, 5.0, 4.0, 3.0, 2.0, 1.0, 0.50, 0.25, or 0.1 hours.

Usually, it is preferable, as a precaution during a touch up process according to the invention, to apply the composition used for touching up not only to obviously bare metal or obviously damaged areas of the initial protective coating, but also over a transition or overlap zone of apparently undamaged initial protective coating adjacent to such areas that obviously need touching up. With increased preference in the order given, such a transition zone has a width that is at least 0.2, 0.5, 0.7, 1.0, 1.5, or 2.0 millimeters and independently preferably, primarily for reasons of economy, is not more than, with increasing preference in the order given, 25, 20, 15, 10, 8.0, 6.0, 5.0, or 3.0 millimeters.

Virtually any kind of initial protective coating can be touched up effectively for many purposes by a process according to this invention. In particular, but without limitation, conversion coatings produced on underlying metal according to the teachings of any one of the following U.S. Patents, the disclosures of all of which, except to any extent that they may be inconsistent with any explicit statement herein, are hereby incorporated herein by reference, may be effectively touched up by a process according to this invention: U.S. Pat. No. 5,769,667 of Jun. 23, 1998 to Dolan; U.S. Pat. No. 5,700,334 of Dec. 23, 1997 to Ishii et al; U.S. Pat. No. 5,645,650 of Jul. 8 1997 to Ishizaki et al.; U.S. Pat. No. 5,683,816 of Nov. 4, 1997 to Goodreau; U.S. Pat. No. 5,595,611 of Jan. 21, 1997 to Boulos et al; U.S. Pat. No. 5,551,994 of Sep. 3, 1996 to Schriever; U.S. Pat. No. 5,534,082 of Jul. 9, 1996 to Dollman et al.; U.S. Pat. No. 5,507,084 of Apr. 16, 1996 to Ogino et al.; U.S. Pat. No. 5,498,759 of Mar. 12, 1996 to Nakada et al.; U.S. Pat. No. 5,498,300 of Mar. 12, 1996 to Aoki et al.; U.S. Pat. No. 5,487,949 of Jan. 30, 1996 to Schriever, U.S. Pat. No. 5,472,524 of Dec. 5, 1995; U.S. Pat. No. 5,472,522 of Dec. 5, 1995 to Kawaguchi et al; U.S. Pat. No. 5,452,884 of Oct. 3, 1995; U.S. Pat. No. 5,451,271 of Sep. 19, 1995 to Yoshida et al.; U.S. Pat. No. 5,449,415 of Sep. 19, 1995 to Dolan; U.S. Pat. No. 5,449,414 of Sep. 12, 1995 to Dolan; U.S. Pat. No. 5,427,632 of Jun. 27, 1995 to Dolan; U.S. Pat. No. 5,415,687 of May 16, 1995 to Schriever; U.S. Pat. No. 5,411,606 of May 2, 1995 to Schriever; U.S. Pat. No. 5,399,209 of Mar. 21, 1995 to Suda et al.; U.S. Pat. No. 5,395, 655 of Mar. 7, 1995 to Kazuyuki et al.; U.S. Pat. No. 5,391,239 of Feb. 21, 1995 to Boulos; U.S. Pat. No. 5,378,392 of Jan. 3, 1995 to Miller et al.; U.S. Pat. No. 5,366,567 of Nov. 22, 1994 to Ogino et al.; U.S. Pat. No. 5,356,490 of Oct. 18, 1994 to Dolan et al.; U.S. Pat. No. 5,342,556 of Aug. 30, 1994 to Dolan; U.S. Pat. No. 5,318,640 of Jun. 7, 1994 to Ishii et al.; U.S. Pat. No. 5,298,092 of Mar. 29, 1994 to Schriever; U.S. Pat. No. 5,281,282 of Jan. 25, 1994 to Dolan et al.; U.S. Pat. No. 5,268,042 of Dec. 7, 1993 to Carlson; U.S. Pat. No. 5,261,973 of Nov. 16, 1993 to Sienkowski et al.; U.S. Pat. No. 5,242,714 of Sep. 7, 1993 to Steele et al.; U.S. Pat. No. 5,143,562 of Sep. 1, 1992 to Boulos; U.S. Pat. No. 5,141,575 of Aug. 25, 1992 to Yoshitake et al.; U.S. Pat. No. 5,125,989 of Jun. 30, 1992 to Hallman; U.S. Pat. No. 5,091,023 of Feb. 25, 1992 to Saeki et al.; U.S. Pat. No. 5,089,064 of Feb. 18, 1992 to Reghi; U.S. Pat. No. 5,082,511 of Jun. 21, 1992 to Farina et al.; U.S. Pat. No. 5,073,196 of Dec. 17, 1991; U.S. Pat. No. 5,045,130 of Sep. 3, 1991 to Gosset et al.; U.S. Pat. No. 5,000,799 of Mar. 19, 1991 to Miyawaki; U.S. Pat. No. 4,992,196 of Feb. 13, 1991 to Hallman; U.S. Pat. No. 4,985,087 of Jan. 15, 1992 to Mori et al.; U.S. Pat. No. 4,966,634 of Oct. 30, 1990 to Saeki et al; U.S. Pat. No. 4,961,794 of Oct. 9, 1990 to Miyamoto et al.; U.S. Pat. No. 4,956,027 of Sep. 11, 1990 to Saeki et al.; U.S. Pat. No. 4,927,472 of May 22, 1990 to Matsushima et al.; U.S. Pat. No. 4,880,476 of Nov. 14, 1989 to Matsuda et al.; U.S. Pat. No. 4,874,480 of Oct. 17, 1989 to Sonoda et al.; U.S. Pat. No. 4,865,653 of Sep. 12, 1989 to Kramer; U.S. Pat. No. 4,849,031 of Jul. 18, 1989 to Hauffe et al.; U.S. Pat. No. 4,846,897 of Jul. 11, 1989 to Nakagawa et al.; U.S. Pat. No. 4,812,175 of Mar. 14, 1989 to Reghi; U.S. Pat. No. 4,801,337 of Jan. 31, 1989 to Higgins; U.S. Pat. No. 4,756,805 of Ju. 12, 1988 to Terada et al.; U.S. Pat. No. 4,749,418 of Jun. 7, 1988 to Saeki et al.; U.S. Pat. No. 4,722,753 of Feb. 2, 1988 to Zirilla et al.; U.S. Pat. No. 4,717,431 of Jan. 5, 1988 to Knaster et al.; U.S. Pat. No. 4,673,444 of Jun. 16, 1987 to Saito et al.; U.S. Pat. No. 4,668,305 of May 26, 1987 to Dallman et al.; U.S. Pat. No. 4,605,525 of Mar. 17, 1987 to Yoshida et al.; U.S. Pat. No. 4,617,346 of Mar. 3, 1987 to Prescott; U.S. Pat. No. 4,644,029 of Feb. 17, 1987 to Cable et al.; U.S. Pat. No. 4,643,778 of Feb. 17, 1987 to Donofrio et al.; U.S. Pat. No. 4,637,840 of Jan. 20, 1987 to Fujii et al.; U.S. Pat. No. 4,637,838 of Jan. 20, 1987 to Rausch et al.; U.S. Pat. No. 4,617,068 of Oct. 14, 1986 to King; U.S. Pat. No. 4,596,607 of Jun. 24, 1986 to Huff et al.; U.S. Pat. No. 4,595,424 of Jun. 17, 1986 to Hacias; U.S. Pat. No. 4,565,585 of Jun. 21, 1986 to Matsuda; U.S. Pat. No. 4,559,087 of Dec. 17, 1985 to Joms et al.; U.S. Pat. No. 4,509,992 of Apr. 9, 1985 to Higgins; U.S. Pat. No. 4,498,935 of Feb. 12, 1985 to Kent et al.; U.S. Pat. No. 4,496,404 of Jan. 29, 1985 to King; U.S. Pat. No. 4,486,241 of Dec. 4, 1984 to Donofrio; U.S. Pat. No. 4,475,957 of Oct. 9, 1984 to Sander; U.S. Pat. No. 4,433,015 of Feb. 21, 1984 to Linders; U.S. Pat. No. 4,419,199 of Dec. 6, 1983 to Hauffe et al.; U.S. Pat. No. 4,419,147 of Dec. 6, 1983 to Murakami et al.; U.S. Pat. No. 4,416,705 of Nov. 22, 1983 to Siemund et al.; U.S. Pat. No. 4,389,260 of Jun. 21, 1983 to Hauffe et al.; U.S. Pat. No. 4,385,096 of May 24, 1983 to Wetzel; U.S. Pat. No. 4,281,203 of Apr. 26, 1983 to Reinhold; U.S. Pat. No. 4,370,177 of Jan. 25, 1983 to Frelin et al.; U.S. Pat. No. 4,341,558 of Jul. 27, 1982 to Yashiro et al.; U.S. Pat. No. 4,339,310 of Jul. 13, 1982 to Oda et al.; U.S. Pat. No. 4,338,141 of Jul. 6, 1982 to Senzaki et al.; U.S. Pat. No. 4,338,140 of Jul. 6, 1982 to Reghi; U.S. Pat. No. 4,316,751 of Feb. 23, 1982 to Prescott et al.; U.S. Pat. No. 4,313,769 of Feb. 2, 1982 to Frelin et al.; U.S. Pat. No. 4,311,535 of Jan. 19, 1982 to Yasuhara et al.; U.S. Pat. No. 4,306,917 of Dec. 22, 1981 to Oda et al.; U.S. Pat. No. 4,295,899 of Oct. 20, 1981 to Oppen; U.S. Pat. No. 4,292,096 of Sep. 29, 1981 to Murakami et al.; U.S. Pat. No. 4,287,004 of Sep. 1, 1981 to Murakami et al.; U.S. Pat. No. 4,278,477 of Jul. 14, 1981 to Reinhold; U.S. Pat. No. 4,273,592 of Jun. 16, 1981 to Kelly; U.S. Pat. No. 4,264,378 of Apr. 28, 1981 to Oppen et al.; U.S. Pat. No. 4,220,486 of Sep. 2, 1980 to Matsushima et al.; U.S. Pat. No. 4,191,596 of Mar. 4, 1980 to Dollman et al.; U.S. Pat. No. 4,183,772 of Jun. 15, 1980 to Davis; U.S. Pat. No. 4,174,980 of Nov. 20, 1979 to Howell, Jr. et al.; U.S. Pat. No. 4,169,741 of Oct. 2, 1979 to Lampatzer et al.; U.S. Pat. No. 4,163,679 of Aug. 7, 1979 to Nagne et al.; U.S. Pat. No. 4,153,479 of May 8, 1979 to Ayano et al.; U.S. Pat. No. 4,149,909 of Apr. 17, 1979 to Hamilton; U.S. Pat. No. 4,148,670 of Apr. 10, 1979 to Kelly; U.S. Pat. No. 4,146,410 of Mar. 27, 1979 to Reinhold; U.S.

Pat. No. 4,142, 917 of Mar. 6, 1979 to Yashiro et al.; U.S. Pat. No. 4,136,073 of Jan. 25, 1979 to Mori et al.; U.S. Pat. No. 4,131,489 of Dec. 26, 1978 to Newhard, Jr.; U.S. Pat. No. 4,108,690 of Aug. 22, 1978 to Heller; U.S. Pat. No. 4,101,339 of Jul. 18, 1978 to Kaneko et al.; U.S. Pat. No. 4,063,968 of Dec. 20, 1977 to Matsushima et al.; U.S. Pat. No. 4,059,452 of Nov. 22, 1977 to Nishijima et al.; U.S. Pat. No. 4,054,466 of Oct. 18, 1977 to King et al.; U.S. Pat. No. 4,017,334 of Apr. 12, 1977 to Matsushima et al.; U.S. Pat. No. 3,989,550 of Nov. 2, 1976 to Newhard; U.S. Pat. No. 3,964,936 of Jun. 22, 1976 to Das; U.S. Pat. No. 3,912,458 of Oct. 4, 1975 to Faigen; U.S. Pat. No. 3,879,237 of Apr. 22, 1975 to Faigen; U.S. Pat. No. 3,876,435 of Apr. 8, 1975 to Dollman; U.S. Pat. No. 3,860,455 of Jun. 14, 1975 to Hansen et al.; U.S. Pat. No. 3,850,700 of Nov. 26, 1974 to Heller; U.S. Pat. No. 3,839,099 of Oct. 1, 1974 to Jones; U.S. Pat. No. 3,819,424 of Jun. 25, 1974 to Russell et al.; U.S. Pat. No. 3,819,422 of Jun. 25, 1974 to Schneider; U.S. Pat. No. 3,819,385 of Jun. 25, 1974 to Schumichen et al.; U.S. Pat. No. 3,759,549 of Mar. 6, 1974 to Matsushima et al.; U.S. Pat. No. 3,758,349 of Sep. 11, 1973 to Engesser; U.S. Pat. No. 3,723,334 of Mar. 27, 1973 to Maurer; U.S. Pat. No. 3,723,192 of Mar. 27, 1973 to Obi et al.; U.S. Pat. No. 3,706,604 of Dec. 19, 1972 to Paxton; U.S. Pat. No. 3,697,332 of Oct. 10, 1972 to Kuehner; U.S. Pat. No. 3,671, 332 of Jun. 20, 1972 to Rausch et al.; U.S. Pat. No. 3,660, 172 of May 2, 1972 to Otto; U.S. Pat. No. 3,645,797 of Feb. 29, 1972 to Lorin; U.S. Pat. No. 3,632,447 of Jan. 4, 1972 to Albrecht et al.; U.S. Pat. No. 3,625,777 of Dec. 7, 1971 to Okabe et al.; U.S. Pat. No. 3,620,777 of Nov. 16, 1972 to Okabe et al.; U.S. Pat. No. 3,619,300 of Nov. 9, 1971 to Heller et al.; U.S. Pat. No. 3,615,912 of Oct. 26, 1971 to Dittel et al.; U.S. Pat. No. 3,615,890 of Oct. 26, 1971 to Montella; U.S. Pat. No. 3,607,453 of Sep. 21, 1971 to Engesser et al; U.S. Pat. No. 3,573,997 of Apr. 6, 1971 to Paxton; U.S. Pat. No. 3,565,699 of Feb. 23, 1971 to Paxton; U.S. Pat. No. 3,547,711 of Dec. 15, 1970 to Ashdown; U.S. Pat. No. 3,544,388 of Dec. 1, 1970 to Russell; U.S. Pat. No. 3,535,168 of Oct. 20, 1970 to Thompson; U.S. Pat. No. 3,533,859 of Oct. 13, 1970 to Engesser et al.; U.S. Pat. No. 3,519,494 of Jul. 7, 1970 to Engesser et al.; U.S. Pat. No. 3,516,875 of Jun. 23, 1970 to Rausch et al.; U.S. Pat. No. 3,515,600 of Jun. 2, 1970 to Jones et al.; U.S. Pat. No. 3,505, 129 of Apr. 7, 1970 to Burstein et al.; U.S. Pat. No. 3,501, 352 of Mar. 17, 1970 to Shah; U.S. Pat. No. 3,493,441 of Feb. 3, 1970 to Rausch et al.; U.S. Pat. No. 3,493,440 of Feb. 3, 1970 to Ashdown; U.S. Pat. No. 3,484,304 of Dec. 16, 1969 to Beach; U.S. Pat. No. 3,468,724 of Sep. 23, 1969 to Reinhold; U.S. Pat. No. 3,467,589 of Sep. 16, 1969 to Rasuch et al.; U.S. Pat. No. 3,462,319 of Aug. 19, 1969 to Campbell; U.S. Pat. No. 3,459,604 of Aug. 5, 1969 to Freeman et al.; U.S. Pat. No. 3,454,483 of Jul. 8, 1969 to Freeman; U.S. Pat. Nos. 3,450,578 of Jun. 17, 1969 to Siemund et al.; U.S. Pat. 3,450,577 of Jun. 17, 1969 to Beach; U.S. Pat. No. 3,449,229 and 3,449,222 of Jun. 10, 1969 to Freeman et al.; U.S. Pat. No. 3,444,007 of May 13, 1969 to Maurer et al.; U.S. Pat. No. 3,425,947 of Feb. 4, 1969 to Rausch et al.; U.S. Pat. Nos. 3,404,046 and 3,404,044 of Oct. 1, 1968 to Russel et al.; U.S. Pat. No. 3,404,043 of Oct. 1, 1968 to Dell; U.S. Pat. No. 3,397,093 of Aug. 13, 1968 to Oswald et al.; U.S. Pat. No. 3,397,092 of Aug. 13, 1968 to Cavanagh; U.S. Pat. No. 3,397,091 and 3,397,090 of Aug. 13, 1968 to Russell et al; U.S. Pat. No. 3,385,738 of May 28, 1968 to Russell; U.S. Pat. No. 3,380,858 of Apr. 30, 1968 to Champaneria et al., U.S. Pat. No. 3,377,212 of Apr. 9, 1968 to Newhard, U.S. Pat. No. 3,347,713 of Oct. 17, 1967 to Lodeseen et al.; U.S. Pat. No. 3,338,755 of Aug. 29, 1967 to Jenkins et al,; U.S. Pat. No. 3,307,980 of Mar. 7, 1967 to Freeman; U.S. Pat. No. 3,297,493 of Jan. 10, 1967 to Blum et al.; U.S. Pat. No. 3,294,593 of Dec. 27, 1966 to Wyszomirski et al.; U.S. Pat. No. 3,268,367 of Aug. 23, 1966 to Nelson; U.S. Pat. No. 3,240,633 of Mar. 18, 1966 to Gowman et al.; U.S. Pat. No. 3,222,226 of Dec. 7, 1965 to Maurer et al.; U.S. Pat. No. 3,218,200 of Nov. 16, 1965 to Henricks; U.S. Pat. No. 3,210,219 of Oct. 5, 1965 to Jenkins; U.S. Pat. No. 3,202,551 of Aug. 24, 1965 to Gerischer et al.; U.S. Pat. No. 3,197,344 of Jul. 27, 1965 to Paxton; U.S. Pat. No. 3,185,596 of May 25, 1965 to Schiffman; U.S. Pat. No. 3,161,549 of Dec. 15, 1964 to Kallenbach; U.S. Pat. No. 3,154,438 of Oct. 27, 1964 to Keller et al.; U.S. Pat. No. 3,146,113 of Aug. 25, 1964 to Lantoin; U.S. Pat. Nos. 3,130, 086 and 3,130,085 of Apr. 21, 1964 to Otto; U.S. Pat. No. 3,101,286 of Aug. 20, 1963 to Reinhold; U.S. Pat. No. 3,090, 710 of May 21, 1963 to Triggle et al.; U.S. Pat. No. 3,046, 165 of Jul. 24, 1962 to Halversen et al.; U.S. Pat. No. 3,041, 215 of Jun. 26, 1962 to Jenkins et al., U.S. Pat. No. 3,007, 817 of Nov. 7, 1961 to Cavanagh et al.; U.S. Pat. No. 2,988, 465 of Jun. 13, 1961 to Newhard et al., U.S. Pat. No. 2,979, 430of Apr. 11, 1961 to Keller et al.; U.S. Pat. No. 2,967,791 of Jan. 10, 1961 to Halversen; U.S. Pat. No. 2,955,061 of Oct. 4, 1960 to Jenkins et al.; U.S. Pat. No. 2,928,763 of Mar. 15, 1960 to Russell et al.; U.S. Pat. No. 2,902,390 of Sep. 1, 1959 to Bell; U.S. Pat. No. 2,892,884 of Jun. 23, 1959 to Rausch et al.; U.S. Pat. No. 2,882,189 of Apr. 14, 1959 to Russell et al; U.S. Pat. No. 2,868,682 of Jan. 13, 1959 to Dell; U.S. Pat. No. 2,851,385 of Sep. 9, 1958 to Spruance et al.; U.S. Pat. No. 2,840,498 of Jun. 24, 1958 to Logue et al.; U.S. Pat. No. 2,835,617 of May 20, 1958 to Maurer; U.S. Pat. No. 2,832,707 of Apr. 29, 1958 to Rossteutscher; U.S. Pat. No. 2,822,697 of Mar. 4, 1958 to Carroll et al.; U.S. Pat. No. 2,819,193 of Jan. 7, 1958 to Rausch; U.S. Pat. No. 2,813,814 of Nov. 19, 1957 to Goodspeed et al.; U.S. Pat. No. 2,813,813 of Nov. 19, 1957 to Ley et al.; U.S. Pat. No. 2,813,812 of Nov. 19, 1957 to Somers et al.; U.S. Pat. No. 2,809,138 of Oct. 8, 1957 to Wagner et al.; U.S. Pat. No. 2,805,969 of Sep. 10, 1957 to Goodspeed et al.; U.S. Pat. No. 2,800,421 of Jul. 23, 1957 to Goodspeed et al.; U.S. Pat. No. 2,798,829 of Jul. 9, 1957 to Newhard et al.; U.S. Pat. No. 2,796,370 of Jun. 18, 1957 to Ostrander et al.; U.S. Pat. No. 2,769,737 of Nov. 6, 1956 to Russell; U.S. Pat. No. 2,702,768 of Feb. 22, 1955 to Hyams; U.S. Pat. No. 2,692,840 of Oct. 26, 1954 to Bell; U.S. Pat. No. 2,665,231 of Jan. 5, 1954 to Amundsen et al.; U.S. Pat. No. 2,609,308 of Sep. 2, 1952 to Gibson; U.S. Pat. No. 2,591,479 of Apr. 1, 1952 to Ward; U.S. Pat. No. 2,438,887 of Mar. 30, 1948 to Spruance, Jr.; U.S. Pat. No. 2,298,280 of Oct. 13, 1942 to Clifford et al.; U.S. Pat. No. 2,210,850 of Aug. 6, 1940 to Curtin; U.S. Pat. No. 2,121,574 of Jun. 21, 1938 1 Romig; U.S. Pat. No. 2,120,212 of Jun. 7, 1938 to Curtin; U.S. Pat. No. 1,911,537 of May 30, 1933 to Tanner; U.S. Pat. No. 1,895,968 of Jan. 31, 1933 to Curtin et al.; U.S. Pat. No. 1,651,694 of Dec. 6, 1927 to Green et al.; U.S. Pat. No. 1,525,904 of Feb. 10, 1925 to Allen; U.S. Pat. No. 1,291,352 of Jan. 14, 1919 to Allen; U.S. Pat. No. 1,287,605 of Dec. 17, 1918 to Allen; and U.S. Pat. No. 1,248,053 of Nov. 27, 1917 to Allen.

A process according to this invention is particularly advantageously applied to touching up a surface in which the undamaged parts are protected by a coating selected from the group consisting of a phosphate conversion coating, a chromate conversion coating, and a conversion coating produced by contacting a predominantly aluminiferous or a predominantly zinciferous surface with an acidic treating solution comprising at least one of fluorosilicate, fluorotitanate, and fluorozirconate.

In addition, of course, metal surfaces with any other type of previously applied protective coating or without any previous deliberately applied coating can be coated in a process according to the invention.

The practice of this invention may be further appreciated by consideration of the following, non-limiting, working examples.

GROUP 1

In this group, a preferred type of base solution for making up working compositions for use in a process according to the invention was first prepared as follows: 0.94 part of pearl cornstarch was slurried together with 8.00 parts of deionized (hereinafter usually abbreviated as "DI") water. In a separate container, 300 parts of DI water, 8.56 parts of chromic acid (i.e., $CrO_3$) crystals, and 1.00 part of an aqueous solution containing 75% of $H_3PO_4$ were mixed together. The previously prepared slurried starch mixture was then added to the other mixture, and all of the thus formed new mixture was heated to boiling temperature, with stirring and reflux condensation of evaporating water, and boiled for 90 minutes to assure complete reaction of the starch. Later analysis showed that 5.2 parts out of the originally added 8.56 parts of chromic acid remained in a hexavalent form after this reaction (and any reaction that may have occurred with other ingredients added later to make a complete working composition for use according to this invention). The remainder of the initially added chromium is presumed to have been reduced to chromium(III) cations that remain dissolved in the solution. (The only significant product derived from the starch under these reaction conditions is believed to be carbon dioxide that escapes into the atmosphere, but if any non-volatile product is formed and remains in the product after boiling, any such residue from the starch does not harm the use of the product or essentially change the nature of the invention.)

TABLE 1

| Ingredient | Concentration in Ppt of Ingredient in Working Composition |
|---|---|
| $H_2ZrF_6$ | 5.0 |
| | 1.00 |
| $H_2SiF_6$ | 5.0 |
| | 1.00 |
| $FeF_3$ | 0.093 |
| HF | 1.00 |
| | 0.50 |
| | 0.10 |
| $H_2O_2$ | 0.15 |
| $H_2MoO_4$ | 5.0 |
| | 1.00 |

The base solution prepared as described in the immediately preceding paragraph was used to form candidate working position according to the invention by adding one of the materials noted in Table 1 to a portion of this base solution, which is diluted, using D1 water, along with these additions so that the "parts" of ingredients, other than starch and the fraction of the initially added chromic acid modified by reactions with starch, that were used to make the base solution, as specified above, are present in 1000 total parts of the final working composition. (All of the chromium atoms contained in the chromic acid originally used are believed to remain in the solution, with these atoms not having been reduced to a trivalent form remaining as hexavalent chromium atoms, which may be present as unchanged chromic acid and/or as chromate and/or condensed chromate anions. All of the forms of hexavalent chromium present in these solutions are believed to be substantially equally effective in forming a protective coating in a process according to this invention.)

Surfaces of conventional rectangular (7.6×25 centimeters) sheet test pieces of Types 7075, 6061, and/or 2024-T3 aluminum were treated according to the invention, after preparatory cleaning and other treatment as follows.

Each panel was placed on a non-slip surface of plastic webbing over absorbent towels, and a rectangular (5.1×7.6 centimeters) Scotch-Brite™ 96 Very Fine green lofty non-woven coated abrasive pad, saturated with water, was used to uniformly scrub the panel lengthwise, using long straight strokes of slight to moderate pressure. The pad was then rinsed well with clean tap water (and left water-saturated) and, using the same side and end of the pad, the panel was rubbed with similar strokes in the crosswise direction. The pad was rinsed again and, using the same side of the pad but the fresh end, the panel was scrubbed in the lengthwise direction once again with similar strokes. The panel was then rinsed briefly with water and subsequently wiped dry with a fresh absorbent paper wiper. The panel was set aside and the pad rinsed well. (The opposite side of the pad was used in the same way on the next panel, and the pad was then discarded).

After two panels had been cleaned and dried, a first treatment according to the invention was applied over the cleaned panel surface in the lengthwise direction, from an applicator as described in U.S. Pat. No. 5,702,759, using even strokes with a 50% overlap. Moderate and even pressure (not nearly enough to activate the valve in the applicator) was used, because using such moderate and even pressure facilitates forming an even coating that has little tendency to dewet. While this coat was drying, another two panels were usually cleaned as described in the immediately preceding paragraph. Usually by the time two more panels had been cleaned, the once coated panels were ready for their second coat. The second coat was applied in the crosswise direction, and then the two freshly cleaned panels were given their first coat.

The treated panels were subjected to salt spray testing and were visually rated qualitatively only for corrosion resistance. The corrosion resistance decreased from the top to the bottom of Table 1 according to this rating, but all of the panels would be satisfactory for many uses.

GROUP 2

In this group, the more promising additives from Group 1 were investigated more thoroughly, along with an organic polymer resin and some combinations of these materials. The base solution was the same as for Group 1, except for the addition of FLUO-RAD™ 430 in an amount corresponding to 0.1 ppt of the final working composition, and the additional constituent or constituents are shown in Table 2. In this table, the abbreviation "AC-73" means RHOPLEX™ AC-73, an acrylic polymer emulsion commercially supplied by Rohm & Haas and reported by its supplier to contain 46–47% of ultimate resin solids.

TABLE 2

| Identifying Number | Content of $H_2ZrF_6$ | Content of HF | Content of AC-73 |
|---|---|---|---|
| 1 | 1.0 ppt | 0 | 0 |
| 2 | 5.0 ppt | 0 | 0 |
| 3 | 1.0 ppt | 1.0 ppt | 0 |

TABLE 2-continued

| Identifying Number | Content of $H_2ZrF_6$ | Content of HF | Content of AC-73 |
|---|---|---|---|
| 4 | 1.0 ppt | 0 | 20 ppt |
| 5 | 5.0 ppt | 0 | 20 ppt |
| 6 | 5.0 ppt | 1.0 ppt | 20 ppt |
| 7 | 3.0 ppt | 0 | 0 |
| 8 | 3.0 ppt | 1.0 ppt | 0 |
| 9 | 0 | 0 | 10 |
| 10 | 7.5 ppt | 1.0 ppt | 0 |
| 11 | 10 ppt | 1.0 ppt | 0 |
| 12 | 5.0 ppt | 0.10 ppt | 0 |
| 13 | 5.0 ppt | 0.25. ppt | 0 |
| 14 | 5.0 ppt | 0.50 ppt | 0 |
| 15 | 5.0 ppt | 0.75 ppt | 0 |

Test substrates were conventional flat panels of Type 2024 aluminum alloy supplied by Advanced Coating Technologies ("ACT") and Aluminum Company of America ("ALCOA") or of Type 7075 aluminum alloy supplied by ALCOA or Kaiser Aluminum Company ("Kaiser"). These were prepared and treated in the same manner as in Group 1, except that a second treatment according to the invention was applied on only half of each substrate panel, so that the effects of both single and double treatments could be evaluated on each panel. The coated panels were then subjected for 504 hours to salt spray testing according to American Society for Testing and Material Procedure B 117, except that the tested panels were maintained at an angle 6° from vertical during their exposure as prescribed by MIL-C-5541E. Results are shown in Table 3.

TABLE 3

| | Rating after 504 Hours of Salt Spray for Substrate: | | | | | | | |
|---|---|---|---|---|---|---|---|---|
| | ACT 2024 with: | | ALCOA 2024 with: | | ALCOA 7075 with: | | Kaiser 7075 with: | |
| Identification Number | 1 Coat | 2 Coats | 1 Coat | 2 Coats | 1 Coat | 2 Coats | 1 Coat | 2 Coats |
| 1 | 10% D, SP | 1% D | 5% D | Good | 10% D | 1% D | 5% D | 1% D, P |
| 2 | 5% D, SP | Good | 5% D | Good | 5% D | Good | 5% D | Good |
| 3 | 1% D | Good | Good | Good | 2% D | Good | 2% D | Good |
| 4 | 1% D | Good | 2% D | Good | 5% D | Good | 2% D | Good |
| 5 | 3% D | Good | 2% D | Good | 5% D, P | Good | Good | Good |
| 6 | 5% D | Good | 2% D | Good | SP | Good | Good | Good |
| 7 | 20% D | Good | Good | Good | SP | Good | Good | Good |
| 8 | 2% D | Good | 1% D | Good | SP | Good | Good | Good |
| 9 | 10% D | Good | 5% D | Good | 1% D | Good | 5% D | Good |
| 10 | 2% D | Good | 1% D | Good | 0.5% D | Good | 2% D | Good |
| 11 | Good | Good | Good | Good | SP | Good | 2% D | Good |
| 12 | 1% D | Good | 3% D | Good | SP | Good | Good | Good |
| 13 | Good | Good | 1% D | Good | 5% D, P | Good | 1% D | Good |
| 14 | Good | Good | 1% D | Good | 2% D, P | Good | 1% D | Good |
| 15 | 1% D | 1% D | 1% D | Good | Good | 1 small pit | 1% D | Good |

Abbreviations and Other Notes for Table 3
"D" means "discoloration"; "SP" means "small pits"; "P" means "pits"; "Good" indicates no pits or discoloration, except sometimes within 0.5 centimeters of the exposed edge, an area which is to be ignored according to the test specifications.

The results in Table 3 suggest that more than 1 ppt of fluorozirconic acid is usually required to achieve excellent corrosion resistance in a single coating, but that even with higher concentrations of fluorozirconic acid, these higher quality results are not consistently achieved. (There are at least two apparent possible causes for this inconsistency: slight variations in substrate compositions and unavoidable inconsistencies in the manual application of coating used. Other unrecognized causes are also possible, of course.) On the other hand, most of the compositions give excellent results with two coats. This suggests that for touching-up processes, where at least two coats are likely to be used in any event to insure a uniform and fully protective coating, a concentration near 1.0 ppt is likely to be most preferred, because it is more economical than a higher concentration and gives good results if used at least twice. For coating previously unprotected metal, in contrast, if the coating conditions can be arranged with reliable control, as in conventional continuous processing of coils, for example, and a consistently suitable substrate is used, higher concentrations of fluorozirconic acid would normally be preferred, because compositions with such higher concentrations can give excellent corrosion protection in a single coating operation.

GROUP 3

In this group, the storage stability of some candidate treatment compositions to be used according to the invention was explored. The compositions were made with the same base solution as for Group 2, with the concentrations of hydrofluoric acid and fluorozirconic acid shown in Table 4. Each composition was placed in a closed container at 49° C. and maintained at that temperature by storage in a thermostatically controlled oven. Each container was examined daily for at least 30 days, unless the formation of a solid precipitate was observed sooner. When precipitate was observed, the storage stability test was ended. Results are shown in Table 4.

TABLE 4

| Concentration in Parts per Thousand of: | | Days Stored before Any |
|---|---|---|
| HF | $H_2ZrF_6$ | Visible Precipitate Formed |
| 0.10 | 5.0 | 3 |
| 0.25 | 5.0 | 13 |
| 0.50 | 5.0 | >30 |
| 0.75 | 5.0 | >30 |
| 1.0 | 3.0 | >30 |
| 1.0 | 5.0 | >30 |
| 1.0 | 75 | >30 |
| 1.0 | 10 | >30 |

The results in Table 4 indicate that at least 0.50 ppt of HF is required to stabilize a composition that contains at least 5.0 ppt of $H_2ZrF_6$ against formation of a precipitate during storage under practical use conditions.

The invention claimed is:

1. A composition for coating or touching up or both coating and touching up a metal surface, said composition comprising water and:

from about 0.5 millimoles per kilogram to about 240 millimoles per kilogram, a unit hereafter abbreviated as "mM/kg" of a component of fluorometallate anions, each of said anions consisting of:

(i) at least four fluorine atoms; and (ii) at least one atom of an element selected from the group consisting of titanium, zirconium, hafnium, silicon, aluminum, and boron, and, optionally, one or both of (iii) at least one ionizable hydrogen atom; and
(iv) at least one oxygen atom;

(B) from about 0.5 grams/liter to about 10 grams/liter, a unit hereafter abbreviated as g/l, of a component of phosphorus-containing inorganic oxyanions or phosphonate anions or both phosphorus-containing inorganic oxyanions and phosphonates anions calculated as the stoichiometric equivalent of $H_3PO_4$; [and]

(C) from about 0.5 g/l to about 3.5 g/l of hexavalent chromium[.]*;*

(D) from about 0.10 g/l to about 2.20 g/l of trivalent chromium cations; *and*

*(E) a component of surfactant molecules that are not part of any of immediately previously recited components, said surfactant containing carbon atoms and fluorine atoms, said fluorine atoms bonded directly to carbon atoms in the molecules and being selected from the group consisting of anionic surfactants, nonionic surfactants, and cationic surfactants;* said liquid composition comprising not more than 0.06% of dispersed silica and silicates.

2. The composition according to claim 1, wherein:

the fluorometallate anions are selected from the group consisting of fluorosilicate, fluorotitanate, and fluorozirconate anions.

3. The composition according to claim 1, wherein:

the fluorometallate anions include fluorozirconate anions;

the concentration of fluorozirconate anions is within a range from about 3.5 to about 6.0 mM/kg, inclusive of 3.5 and 6.0 mM/kg;

the total concentration of phosphorus-containing inorganic oxyanions and phosphonate anions, calculated as their stoichiometric equivalent as $H_3PO_4$ is within a range from about 0.50 to about 1.00 g/l, inclusive of 0.50 and 1.00 g/l;

the concentration of hexavalent chromium is within a range from about 2.25 to about 3.5 g/l, inclusive of 2.25 and 3.5 g/l;

the concentration of chromium(III) cations is within a range from about 1.25 to about 2.20 g/l, inclusive of 1.125 and 2.20 g/l;

wherein a ratio of hexavalent chromium to chromium(III) ions is within a range from about 2.5:1.00 to about 1.30:1.00, inclusive of 2.5:1.00 and 1.30:1.00.

4. The composition according to claim 3 which further include fluorinated alkyl ester surfactants molecules in a concentration that is within a range from about 0.070 to about 0.13 parts per thousand, at unit hereinafter abbreviated as "ppt", said range being inclusive of 0.070 and 0.13 ppt.

5. The composition according to claim 1, wherein:

the fluorometallate anions include fluorozirconate anions;

the concentration of fluorozirconate anions is within a range from about 18.0 to about 30.0 mM/kg, inclusive of 18.0 and 30.0 mM/kg;

The total concentration of phosphorus-containing inorganic oxyanions and phosphonate anions, calculated as their stoichiometric equivalent as $H_3PO_4$ is within a range from about 0.50 to about 1.00 g/l, inclusive of 0.50 and 1.00 g/l;

the concentration of hexavalent chromium is within a range from about 2.25 to about 3.5 g/l, inclusive of 2.25 and 3.5 g/l;

the concentration of chromium(III) cations is within a range from about 1.25 to about 2.20 g/l, inclusive of 1.25 and 2.20 g/l;

wherein a ratio of hexavalent chromium to chromium(III) ions is within a range from about 2.4:1.00 to about 1.30:1.00, inclusive of 2.5:1.00 and 1.30:1.00; and further including from about 0.70 ppt to about 1.3 ppt of hydrofluoric acid, inclusive of 0.70 and 1.3 ppt.

6. The composition according to claim 5 which further includes from about 0.070 ppt to about 0.13 ppt fluorinated alkyl ester surfactant molecules inclusive of 0.070 and 0.13 ppt.

7. A composition for coating or touching up or both coating and touching up a metal surface, said composition being made by mixing together a first mass of water and at least the following components:

(A) a second mass of a water-soluble source of fluorometallate anions to provide in the composition from about 0.5 mM/kg to about 240 mM/kg of the fluorometallate anion, each of said anions consisting of:
(i) at least four fluorine atoms; and
(ii) at least one atom of an element selected from the group consisting of titanium, zirconium, hafnium, silicon, aluminum, and boron, and, optionally, one or both of
(iii) at least one ionizable hydrogen atom[.]*;* and
(iv) at least one oxygen atom;

(B) a third mass of one or more water-soluble sources of phosphorus-containing inorganic oxyanions, phosphonate anions or both phosphorus-containing inorganic oxyanions and phosphonate anions; to provide in the composition from about 0.5 g/l to about 10 g/l, calculated as their [stoichiontic] *stoichiometric* equivalent of $H_3PO_4$; [and]

(C) a fourth mass of a water-soluble source of hexavalent chromium cations to provide the composition with from about 0.5 g/l to about 3.5 g/l of hexavalent chromium cation[.]*;*

(D) a fifth mass of a component to provide the composition with from about 0.10 g/l to about 2.20 g/l of chromium(III) cation*; and*

*(E) a sixth mass of a component of surfactant molecules that are not part of any of immediately previously recited components, said surfactant containing carbon atoms and fluorine atoms, said fluorine atoms bonded directly to carbon atoms in the molecules and being selected from the group consisting of anionic surfactants, nonionic surfactants, and cationic surfactants.*

8. The composition according to claim 7, wherein:

the fourth mass comprises hexavalent chromium in an amount that corresponds, after any reaction with any reducing agents for hexavalent chromium that are mixed together with it to constitute said composition, to a concentration of residual hexavalent chromium in said composition that is within a range from about 0.50 g/l to about 3.5 g/l.

9. The composition according to claim 8, wherein:

the second mass comprises fluorozirconate anions in an amount that corresponds to a concentration, in said composition, that is within a range from about 3.50 mM/kgs to about 6.0 mM/kg, inclusive of 3.50 mM/kg and 6.0 mM/kg;

the third mass corresponds to a total concentration of phosphorus-containing inorganic oxyanions and phosphonate anions, calculated as their stoichiometric equivalents as $H_3PO_4$, that is within a range from about 0.50 to about 1.00 g/l, inclusive of 0.50 and 1.00 g/l;

the fourth mass comprises chromic acid in an amount that:

corresponds to a total concentration, in said composition, of hexavalent chromium ions that is within a range from about 2.25 to about 3.5 g/l, inclusive of 2.25 and 3.5 g/l;

is the source of hexavalent chromium for the composition; and together with a sixth mass of reducing agent that is also mixed into the composition, is also the source of the trivalent chromium ions for the composition, and said sixth mass of reducing agent corresponds stoichiometrically, in its reaction with chromic acid, to a concentration, in said composition, of chromium(III) ions that is within a range from about 1.25 mM/kg to about 2.20 mM/kg, inclusive of 1.25 mM/kg and 2.20 mM/kg;

wherein a ratio of hexavalent chromium to chromium(III) ions that is within a range from about 2.5:1.00 to about 1.30:1.00, inclusive of 2.5:1.00 and 1.30:1.00;

there is also mixed into said composition a seventh mass of fluorinated alkyl ester surfactant molecules that corresponds to a concentration, in said composition, that is within a range from about 0.070 to about 0.13 ppt, inclusive of 0.070 and 0.13 ppt.

10. The composition according to claim 7, wherein:

the second mass comprises fluorozirconate anions in an amount that corresponds to a concentration, in said composition, of fluorozirconate anions that is within a range from about 18 mM/kg to about 30 mM/kg, inclusive of 18 and 30 mM/kg;

the third mass corresponds to a total concentration of phosphorus-containing inorganic oxyanions and phosphonate anions, calculated as its stoichiometric equivalent as $H_3PO_4$, that is within a range from about 0.50 to about 1.00 g/l, inclusive of 0.50 and 1.00 g/l; the fourth mass comprises chromic acid in an amount that:

corresponds to a total concentration, in said composition, of hexavalent chromium atoms that is within a range from about 2.25 to about 3.5 g/l, inclusive of 2.25 and 3.5 g/l;

is the source of hexavalent chromium for the composition; and together with a sixth mass of reducing agent that is also mixed into the composition, is also the source of the trivalent chromium ions for the composition; and said sixth mass of reducing agent corresponds stoichiometrically, in its reaction with chromic acid, to a concentration, in said composition, of chromium(III) ions that is within a range from about 1.25 to about 2.20 g/l, inclusive of 1.25 and 2.20 g/l;

there is a ratio of hexavalent chromium to chromium(III) ions that is within a range from about 2.5:1.00 to about 1.30:1.00, inclusive of 2.5:1.00 and 1.30:1.00;

there is additionally mixed into said composition an eighth mass of hydrofluoric acid that corresponds to a concentration, in said composition, that is within a range from about 0.70 to about 1.3 ppt, inclusive of 0.70 and 1.3 ppt; and there is also mixed into said composition a seventh mass of fluorinated alkyl ester surfactant molecules that corresponds to a concentration, in said composition, that is within a range from about 0.070 to about 0.13 ppt, inclusive of 0.070 and 0.13 ppt.

11. A process for coating or touching up or both coating and touching up a surface, said surface comprising at least one area of bare metal, at least one area of coating over an underlying metal substrate, or both of at least one area of bare metal and at least one area of coating over an underlying metal substrate, said process comprising operations of:

(I) covering the surface to be coated, touched up, or both coated and touched up with a layer of a liquid composition of claim 1; and (II) drying the liquid layer formed in operation (I).

12. The process according to claim 11, wherein:

the surface comprises at least one area of bare metal and at least one area of coating over an underlying metal substrate; and in operation (I), the liquid layer is formed over the at least one area of bare metal.

13. The process according to claim 11, wherein, in said liquid composition used in operation (I):

the fluorometallate anions are selected from the group consisting of fluorosilicate, fluorotitanate, and fluorozirconate anions.

14. The process according to claim 11, wherein, in said liquid composition used in operation (I):

the fluorometallate anions include fluorozirconate anions;

the concentration of fluorozirconate anions is within a range from about 3.5 to about 6.0 mM/kg, inclusive of 3.5 and 6.0 mM/kg, the total concentration of phosphorous-containing inorganic oxyanions and phosphonate anions, calculated as their stoichiometric equivalents as $H_3PO_4$, is within a range from about 0.50 to about 1.00 g/l, inclusive of 0.50 and 1.00 g/l;

the concentration of hexavalent chromium is within a range from about 2.25 to about 3.5 g/l, inclusive of 2.25 and 3.5 g/l;

the concentration of chromium(III) ions is within a range from about 1.25 to about 2.20 g/l, inclusive of 1.25 and 2.20 g/l; and wherein, a ratio of hexavalent chromium to chromium(III) ions is within a range from about 2.5:1.00 to about 1.30:1.00, inclusive of 2.5:1.00 and 1.30:1.00; and the composition further includes a surfactant comprising fluorinated alkyl ester molecules in a concentration that is within a range from about 0.070 to about 0.13 ppt, inclusive of 0.070 and 0.13 ppt.

15. The process according to claim 14, wherein:

the surface comprises at least one area of bare metal adjacent to at least one area of coating over an underlying metal substrate, said at least one area of coating over an underlying metal substrate comprising a first portion and a second portion, in operation (I), the liquid layer is formed over both the area of bare metal and at least the first portion of said adjacent area of coating over an underlying metal substrate; and the coating over an underlying metal substrate is selected from the group consisting of a phosphate conversion coating, a chromate conversion coating, and a conversion coating produced by contacting a predominantly aluminiferous or a predominantly zinciferous surface with an acidic treating solution comprising at least one of fluorosilicate, fluorotitanate, and fluorozirconate.

16. The process according to claim 13, wherein, in the liquid composition used in operation (I):

the fluorometallate anions include fluorozirconate anions;

the concentration of fluorozirconate anions is within a range from about 18.0 to about 30 mM/kg inclusive of 18.0 and 30.0 mM/kg;

the total concentration of phosphorus-containing inorganic oxyanions and phosphonate anions, calculated as their stoichiometric equivalent as $H_3PO_4$, is within a range from about 0.50 to about 1.00 g/l, inclusive of 0.50 and 1.00 g/l;

the concentration of hexavalent chromium is within a range from about 2.25 to about 3.5 g/l, inclusive of 2.25 and 3.5 g/l;

the concentration of chromium(III) ions is within a range from about 1.25 to about 2.20 g/l, inclusive of 1.25 and 2.20 g/l;

a ratio of hexavalent chromium to chromium(III) ions that is within a range from about 2.5:1.00 to about 1.30:1.00, inclusive of 2.5:1.00 and 1.30:1.00;

a concentration of hydrofluoric acid that is within a range from about 0.70 to about 1.3 ppt, inclusive of 0.70 and 1.3 ppt; and wherein the composition includes fluorinated alkyl ester surfactant molecules in a concentration that is within a range from about 0.070 to about 0.13 ppt, inclusive of 0.070 and 0.13 ppt.

17. A process for coating or touching up or both coating and touching up a surface, said surface comprising at least one area of bare metal, at least one area of coating over as underlying metal substrate, or both of at least one area of bare metal and at least one area of coating over an underlying metal substrate, said process comprising operations of:

(I) covering the areas to coated, touched up, or both coated and touched up with a layer of a liquid composition, said liquid composition having been made by mixing together a first mass of water and at least the following components:

(A) a second mass of a water-soluble source of fluorometallate anions to provide in the composition from about 0.5 mM/kg to about 30 mM/kg of the fluorometallate anion, each of said anions consisting of:

(i) at least four fluorine atoms; and (ii) at least one atom of an element selected from the group consisting of titanium, zirconium, hafnium, silicon, aluminum, and boron; and, optionally, one or both of (iii) at least one ionizable hydrogen atom; and (iv) at least one oxygen atom;

(B) a third mass of one or more water-soluble sources of phosphorus-containing inorganic oxyanions, phosphonate anions or both phosphorus-containing inorganic oxyanions and phosphonate anions; to provide in the composition from about 0.5 g/l to about 10 g/l, calculated as their [stoichiontic] *stoichiometric* equivalent [or] *of* $H_3PO_4$; [and]

(C) a fourth mass of a water-soluble source of hexavalent chromium cations to provide the composition with from about 0.5 g/l to about 3.5 g/l of hexavalent chromium cation;

(D) a fifth mass of component to provide the composition with from about 0.10 g/l to about 2.20 g/l of chromium (III) cation[.]; *and*

(*E*) *a sixth mass of a component of surfactant molecules that are not part of any of immediately previously recited components, said surfactant containing carbon atoms and fluorine atoms, said fluorine atoms bonded directly to carbon atoms in the molecules and being selected from the group consisting of anionic surfactants, nonionic surfactants, and cationic surfactants*;

said composition not comprising more than about 0.060% of dispersed silicates; and (II) drying into place over the surface the liquid layer formed in operation (I).

18. The process according to claim 17, wherein:

the surface comprises at least one area of bare metal and at least one area of coating over an underlying metal substrate; and in operation (I), the liquid layer is formed over the at least one area of bare metal.

19. The process according to claim 17, wherein the liquid composition further comprises from about 0.70 to about 1.3 ppt of hydrofluoric acid.

20. The process according to claim 19, wherein:

the second mass comprises fluorozirconate anions in an amount that corresponds to a concentration, in said composition, that is within a range from about 3.50 mM/kg to about 6.0 mM/kg, inclusive of 3.50 and 6.0 mM/kg;

the third mass corresponds to a total concentration of phosphorus-containing inorganic oxyanions and phosphonate anions, calculated as their stoichiometric equivalents as $H_3PO_4$, that is within a range from about 0.50 to about 1.00 g/l, inclusive of 0.50 and 1.00 g/l;

the fourth mass comprises chromic acid in an amount that:

corresponds to a total concentration, in said composition, of hexavalent chromium ions that is within range from about 2.25 to about 3.5 g/l, inclusive of 2.25 and 3.5 g/l;

is the source of hexavalent chromium for the composition; and together with a sixth mass of reducing agent that is also mixed into the composition, is also the source of the trivalent chromium ions for the composition; and said sixth means of reducing agent corresponds stoichiometrically, in its reaction with chronic acid, to a concentration, in said composition, of chromium(III) ions that is within a range from about 1.25 to about 2.20 g/l, inclusive of 1.25 and 2.20 g/l;

wherein a ratio of hexavalent chromium to chromium(III) ions that is within a range from about 2.5:1.00 to about 1.30:1.00, inclusive of 2.5:1.00 and 1.30:1.00;

there is also mixed into said composition a seventh mass of fluorinated alkyl ester surfactant molecules that corresponds to a concentration, in said composition, that is within a range from about 0.070 to about 0.13 ppt, inclusive of 0.070 and 0.13 ppt.

21. The process according to claim 20, wherein:

the surface comprises at least one area of bare metal adjacent to at least one area of coating over an underlying metal substrate, said at least one area of coating over an underlying metal substrate comprising a first portion and a second portion;

in operation (I), the liquid layer is formed over both the area of bare metal and at least the first portion of said adjacent area of coating over an underlying metal substrate; and the coating over an underlying metal substrate is selected from the group consisting of a phosphate conversion coating, a chromate conversion coating, and a conversion coating produced by contacting a predominantly aluminiferous or a predominantly zinciferous surface with an acidic treating solution comprising at least one of fluorosilicate, fluorotitanate, and fluorozirconate.

22. The process according to claim 19, wherein:

the second mass comprises fluorozirconate anions in an amount that corresponds to a concentration, in said composition, of fluorozirconate anions that is within a range from about 18 to about 30 mM/kg, inclusive of 18 and 30 mM/kg;

the third mass corresponds to a total concentration of phosphorus-containing inorganic oxyanions and phosphonate anions, calculated as its stoichiometric equivalent as $H_3PO_4$, that is within a range from about 0.50 to about 1.00 g/l, inclusive of 0.50 and 1.00 g/l;

the fourth mass comprises chronic acid in an amount that:

corresponds to a total concentration, in said composition, of hexavalent chromium cations within a range from about 2.25 to about 3.5 g/l, inclusive of 2.25 and 3.5 g/l;

is the source of hexavalent chromium for the composition; and together with a sixth mass of reducing agent that is also mixed into the composition, is also the source of the trivalent chromium ions for the composition; and said sixth mass of reducing agent corresponds stoichiometrically, in its reaction with chromic acid, to a concentration, in said composition, of chromium(III) ions that is within a range from about 1.25 to about 2.20 g/l, inclusive of 1.25 and 2.20 g/l;

in said liquid composition, there is a ratio of hexavalent chromium to chromium(III) ions that is within a range from about 2.5:1.00 to about 1.30:1.00, inclusive of 2.5:1.00 and 1.30:1.00;

there is additionally mixed into said composition an eighth mass of hydrofluoric acid that corresponds to a concentration, in said composition, that is within a range from about 0.70 to about 1.3 ppt, inclusive of 0.70 and 1.3 ppt;

there is also mixed into said composition a seventh mass of fluorinated alkyl ester surfactant molecules that corresponds to a concentration, in said composition, that is within a range from about 0.070 to about 0.13 ppt, inclusive of 0.070 and 0.13 ppt.

* * * * *